US012781913B2

(12) United States Patent
Gorden et al.

(10) Patent No.: US 12,781,913 B2
(45) Date of Patent: Nov. 3, 2026

(54) TELESCOPING LEG AND METROLOGY TRIPOD THEREWITH

(71) Applicant: MetrologyWorks, Inc., Buckner, MO (US)

(72) Inventors: Joel Gorden, Buckner, MO (US); Justin Bell, Buckner, MO (US)

(73) Assignee: MetrologyWorks, Inc., Buckner, MO (US)

( * ) Notice: Subject to any disclaimer, the term of this patent is extended or adjusted under 35 U.S.C. 154(b) by 93 days.

(21) Appl. No.: 18/830,394

(22) Filed: Sep. 10, 2024

(65) Prior Publication Data

US 2025/0084959 A1 Mar. 13, 2025

Related U.S. Application Data

(60) Provisional application No. 63/537,814, filed on Sep. 11, 2023.

(51) Int. Cl.
*F16M 11/34* (2006.01)

(52) U.S. Cl.
CPC .................................. *F16M 11/34* (2013.01)

(58) Field of Classification Search
CPC .. F16B 7/105; F16B 7/18; F16B 7/182; F16B 7/187; F16B 7/10; F16B 7/1472; F16M 2200/028; F16M 11/26; F16M 11/34
See application file for complete search history.

(56) References Cited

U.S. PATENT DOCUMENTS 3,667,713 A 6/1972 Clarke
7,628,369 B2 * 12/2009 Chen ...................... F16B 7/105 248/354.3
8,186,012 B2 5/2012 Mann
8,196,504 B2 * 6/2012 Keng .................... F16M 11/10 89/203
8,567,825 B2 * 10/2013 Canale .................... A47L 9/244 285/302
10,295,292 B2 * 5/2019 Ding ................... F16M 11/247
(Continued)

FOREIGN PATENT DOCUMENTS

CA 1127599 A * 7/1982 ............. F16B 7/105
DE 3604497 A * 8/1987
(Continued)

OTHER PUBLICATIONS

Extended European Search Report for European Application No. 24199773.3 mailed Jan. 29, 2025, 9 pages.

*Primary Examiner* — Eret C Mcnichols
(74) *Attorney, Agent, or Firm* — Cozen O'Connor

(57) ABSTRACT

A telescoping leg includes a leg tube, a leg, a knee, and a locking mechanism. The leg is shaped and sized to slide within the leg tube, and has a linear array of holes. The knee is between the leg tube and the leg, at least partially surrounds an end of the leg tube from which the leg extends. The locking mechanism is located at a knee aperture of the knee, and includes a locating pin having a tip extending through the locking-mechanism and a spring that applies a force on the locating pin. When the locating pin is aligned with a hole and the spring is not subject to an externally-applied force, the tip extends into the tapered hole and mates with an interior surface of the hole to secure a position of the leg within the leg tube. The tip and the hole may be correspondingly tapered.

19 Claims, 4 Drawing Sheets

(56) References Cited

U.S. PATENT DOCUMENTS

| | | | | | |
|---|---|---|---|---|---|
| 10,309,581 | B2 * | 6/2019 | Underwood | F16B 7/105 | |
| 10,514,278 | B1 * | 12/2019 | Becker | G01D 11/30 | |
| 10,738,938 | B2 * | 8/2020 | Becker | F16M 11/36 | |
| 10,775,207 | B2 * | 9/2020 | Becker | F16M 11/046 | |
| 11,951,952 | B2 * | 4/2024 | Wang | B60R 9/045 | |
| 2005/0205729 | A1 * | 9/2005 | Wang | F16M 13/027 | 248/161 |
| 2006/0062632 | A1 | 3/2006 | Jang | | |
| 2007/0003361 | A1 * | 1/2007 | Wang | F16B 7/105 | 403/109.3 |
| 2008/0169405 | A1 * | 7/2008 | Chen | F16B 7/105 | 248/354.3 |
| 2010/0140436 | A1 * | 6/2010 | Wu | F16B 7/105 | 248/354.4 |
| 2010/0282926 | A1 * | 11/2010 | Shen | F16M 11/36 | 248/179.1 |
| 2019/0032841 | A1 * | 1/2019 | Becker | G01C 15/00 | |
| 2023/0001859 | A1 * | 1/2023 | Wang | B60R 9/045 | |

FOREIGN PATENT DOCUMENTS

| | | | | |
|---|---|---|---|---|
| DE | 202004001261 | U1 | 4/2004 | |
| DE | 202005008613 | U1 | 8/2005 | |
| EP | 3473785 | A1 * | 4/2019 | E04H 12/182 |
| EP | 3473785 | B1 | 7/2020 | |
| KR | 200355581 | Y1 | 7/2004 | |
| WO | 2011059155 | A1 | 5/2011 | |

* cited by examiner

TELESCOPING LEG AND METROLOGY TRIPOD THEREWITH

RELATED APPLICATIONS

This application claims priority to U.S. Provisional Patent Application No. 63/537,814, filed 11 Sep. 2023, the entirety of which is incorporated herein by reference.

BACKGROUND

Portable metrology instruments such as coordinate measuring machine ("CMM") arms and laser trackers are dependent on a stable mounting base to achieve high repeatability and accuracy. One type of mounting base is a tripod with adjustable height.

SUMMARY OF THE EMBODIMENTS

A typical tripod has extendable legs that can be adjusted to set the tripod height. A pressure knob on each leg secures the extendable leg in a leg tube at one position. Changing the height of a typical tripod with the metrology instrument on the tripod requires loosening each pressure knob. A risk of this is that, with at least one of the legs not being secured during the height adjustment process, the tripod will collapse under the weight of the instrument, which could damage one or both of the instrument and the tripod itself.

Embodiments disclosed herein address this problem and provide significant advantages over prior art tripods. The embodiments herein may utilize a plurality of locating holes with a corresponding locating pin that has a tapered shape corresponding to a taper of each locating hole such that the extendable leg is locked in place in response to the locating pin being pressed against the tapered hole by a force applicator. For example, at least some embodiments include a spring-loaded locking pin (where the force applicator is a spring) with a tapered pin. The locking pin allows for easy extension and retraction of the extendable leg while a spring-loaded locking pin prevents the leg from retracting rapidly on mis-handling of the extendable leg because the locking pin will be forced into a corresponding locking hole by the associated spring. The spring also provides an amount of force that causes the tapered edge of the spring-loaded pin to interact with the tapered shape of the locating hole thereby preventing the extendable leg from movement. This prevented movement provides a stable platform for the instrument mounted to the tripod.

Furthermore, in embodiments including a threaded pin (where the force applicator is a threads on a threaded portion of the threaded pin), the threaded pin may also have a tapered edge that corresponds with a tapered hole (e.g., one of a plurality of tapered holes that both the threaded pin and the spring-loaded pin may interact with). Tightening (screwing) the threaded pin causes the tapered edge of the threaded pin to interact with the tapered locating hole in an event more stable manner and prevent any movement of the extendable leg. This enables a highly-stable platform for the instrument located on the tripod.

Moreover, the locking hole is one of a linear array of locking holes. The linear array of locking holes allows for precise and repeatable adjustment of the extendable leg (in addition to reducing falling where a spring-loaded locking pin is used as discussed above). Prior-art tripod extension legs have a clamping system that requires a user to fine-tune adjust to a specific height because there are no pre-defined adjustment locations (except for fully-extended and fully-retracted, for example). In contrast, the linear array of locking holes allows for a repeatable exact height location.

The above-discussed advantages are compounded where the embodiments of a tripod include a "dual-type" locking system including both the threaded locking pin and the spring-loaded locking pins discussed herein. The spring-loaded locking pin allows for quick and repeatable adjustment advantages, while having some advantageous stability. The addition of the threaded-type locking pin then provides for even more stability due to the additional force applied by the threaded-nature of the locking pin as compared to a spring-loaded nature.

In a first aspect, a telescoping leg includes a leg tube, an extendable leg, a knee, and a locking mechanism. The extendable leg is shaped and sized to slide within the leg tube, and has a linear array of tapered holes in a longitudinal direction along one side of the extendable leg. The knee is between the leg tube and the extendable leg, at least partially surrounds an end of the leg tube from which the extendable leg extends, and includes a knee aperture. The locking mechanism is located at the knee aperture and includes (i) a locating pin having a tapered tip extending through the knee aperture toward the linear array of tapered holes; and (ii) a spring that applies a force on the locating pin. The force is perpendicular to the longitudinal direction. When (i) the locating pin is aligned with one tapered hole of the linear array of tapered holes and (ii) the spring is not subject to an externally-applied force, the tapered tip extends into the one tapered hole and mates with an interior surface of the one tapered hole to secure a position of the extendable leg within the leg tube.

In a second aspect, a telescoping leg includes a leg tube, an extendable leg, a knee, threaded pin, and a locking mechanism. The extendable leg is shaped and sized to slide within the leg tube, and has a linear array of holes in a longitudinal direction along one side of the extendable leg. The knee is between the leg tube and the extendable leg, at least partially surrounds an end of the leg tube from which the extendable leg extends, and includes a knee aperture and a knee aperture. The threaded pin, when screwed into the threaded aperture, secures a position of the extendable leg within the leg tube. The locking mechanism is located at the knee aperture and includes (i) a locating pin having a tip extending through the knee aperture toward the linear array of holes; and (ii) a spring that applies a force on the locating pin. The force is perpendicular to the longitudinal direction. When (i) the locating pin is aligned with one hole of the linear array of holes and (ii) the spring is not subject to an externally-applied force, the tip extends into the one hole and mates with an interior surface of the one hole to further secure the position of the extendable leg.

DETAILED DESCRIPTION OF THE EMBODIMENTS

Figure 1:
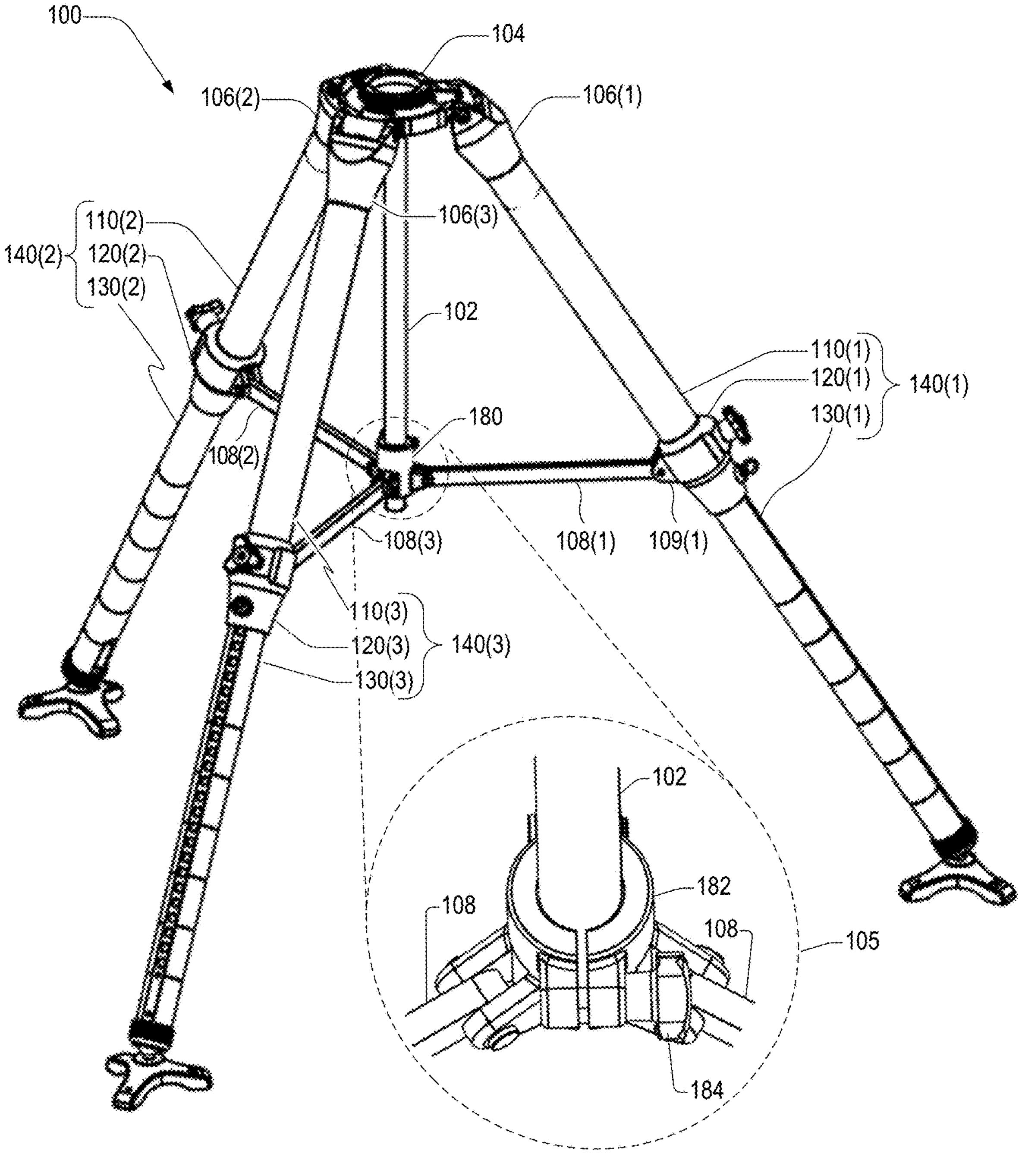
FIG. 1 is a schematic of a metrology tripod that includes a telescoping leg, in embodiments.

FIG. 1 is a schematic of a tripod 100, which may be used as a stand for metrology-based devices. Tripod 100 includes a center column 102, a base support 104, shoulder assemblies 106(1,2,3), struts 108(1,2,3), leg tubes 110(1, 2, 3), extendable legs 120(1, 2, 3), and knees 130(1, 2, 3), herein also a "leg support." Tripod 100 also includes knee-strut connectors 109(1, 2, 3), of which only knee-strut connector 109(1) is visible in FIG. 1. The material composition of each of the aforementioned parts may be or include a metal such as aluminum or steel, e.g., stainless steel. The material composition may be or include a non-metal, such a polymer or plastic, without departing from the scope hereof.

Tripod 100 may also include a tensioning hub 180 that connects each strut 108 to center column 102. In embodiments, tensioning hub 180 is not threadedly attached to center column 102. For example, as shown in inset 105 of FIG. 1, tensioning hub 180 may be, or include, a clamping shaft collar 182 that at least partially surrounds center column 102 and is securely attached to center column 102 by tightening a clamping screw 184 of clamping shaft collar 182. Clamping screw 184 may be implemented via other tightening means, such as a cam-based clamp.

Base support 104 is attached to center column 102. Each shoulder assembly 106 is attached to base support 104. Tripod 100 includes telescoping legs 140(1, 2, 3), each of which includes one leg tube 110 and one knee 120, and one extendable leg 130. Knee-strut connector 109(*k*) attaches strut 108(*k*) to center telescoping leg 140(*k*). Each strut 108(*k*) is attached to, and extends from, center column 102 and rigidly displaces a respective telescoping leg 140(*k*) from center column 102, where index k equals 1, 2, or 3.

Figure 2:
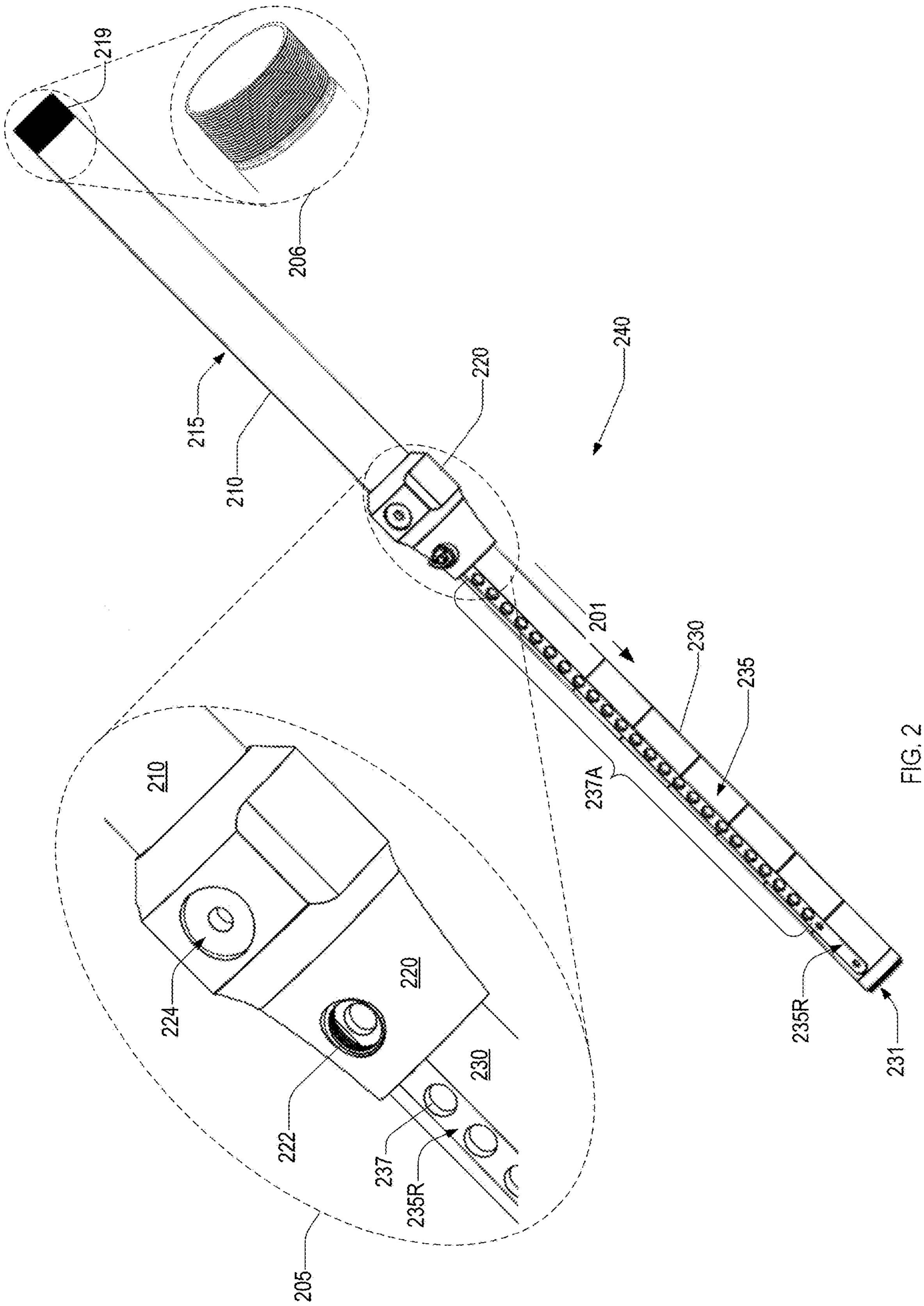
FIGS. 2 and 3 are respective schematics of a telescoping leg, which is an example of the telescoping leg of FIG. 1, in embodiments.
Figure 3:
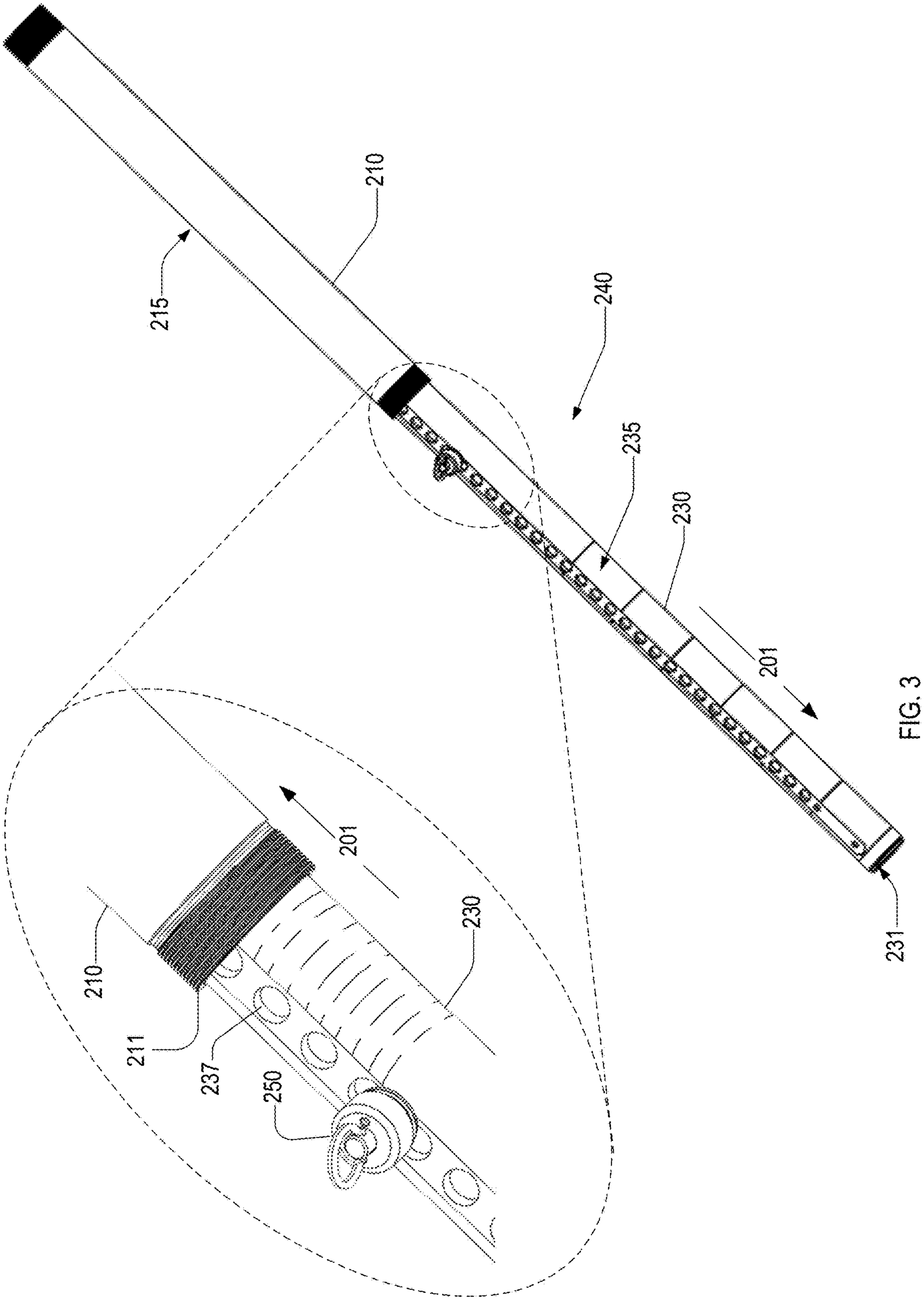

FIGS. 2 and 3 are respective schematics of a telescoping leg 240, which is an example of telescoping leg 140. Telescoping leg 240 includes a leg tube 210, an extendable leg 230, a knee 220, which are respective examples of leg tube 110, extendable leg 130, and knee 120. Telescoping leg 240 also includes a locking mechanism 250 secured to the knee (e.g., integral to knee 220 or separate therefrom and fastened or screwed thereto). For clarity of illustration, FIG. 3 does not include knee 220. FIGS. 2 and 3 are best viewed together in the following description.

Leg tube 210 has a leg end 219 that is attached to shoulder assembly 106. Leg-end 219 may be threaded, as shown in an inset 206 of FIG. 2, and attached to a threaded aperture of shoulder assembly 106.

Extendable leg 230 is shaped and sized to slide within leg tube 210, and includes a bottom base surface 231, a top base surface 439 (shown in FIG. 4) within leg tube 210, and a lateral surface 235 that spans between base surface 231 and top base surface 439. Lateral surface 235 has a plurality of locating holes 237 that form a linear hole-array 237A in a longitudinal direction 201 along one side of extendable leg 230. Each locating hole 237 may have tapered sidewalls.

Extendable leg 230 extends from a leg-end 211 of leg tube 210 opposite leg-end 219. Each locating hole 237 may be a through hole or a blind hole. In a plane perpendicular to direction 201, a cross-sectional shape of extendable leg 230 may be circular, elliptical, or polygonal. In embodiments, linear hole-array 237A is in a recessed region 235R of lateral surface 235. Recessed region 235R may be flat.

Knee 220 is between leg tube 210 and extendable leg 230, at least partially surrounds leg-end 211. Knee 220 may be attached, e.g., mechanically attached to leg tube 210. For example, leg-end 211 may be threaded, as shown in FIG. 3, and attached to a threaded aperture of knee 220, where the axis of rotation is about direction 201. Alternatively, knee 220 and leg tube 210 may be integrally formed such that knee 220 and leg tube 210 are a single piece (monolithic).

Knee 220 includes a knee aperture 222, as shown in an inset 205 of FIG. 2. Locking mechanism 250 is at knee aperture 222. Part of locking mechanism 250 may be within knee aperture 222. In embodiments, knee aperture 222 is threaded, and locking mechanism 250 has a threaded exterior lateral surface, and is screwed into knee aperture 222. Knee 220 may also include a threaded aperture 224. Locking mechanism 250 may be or include an indexing plunger.

Figure 4:
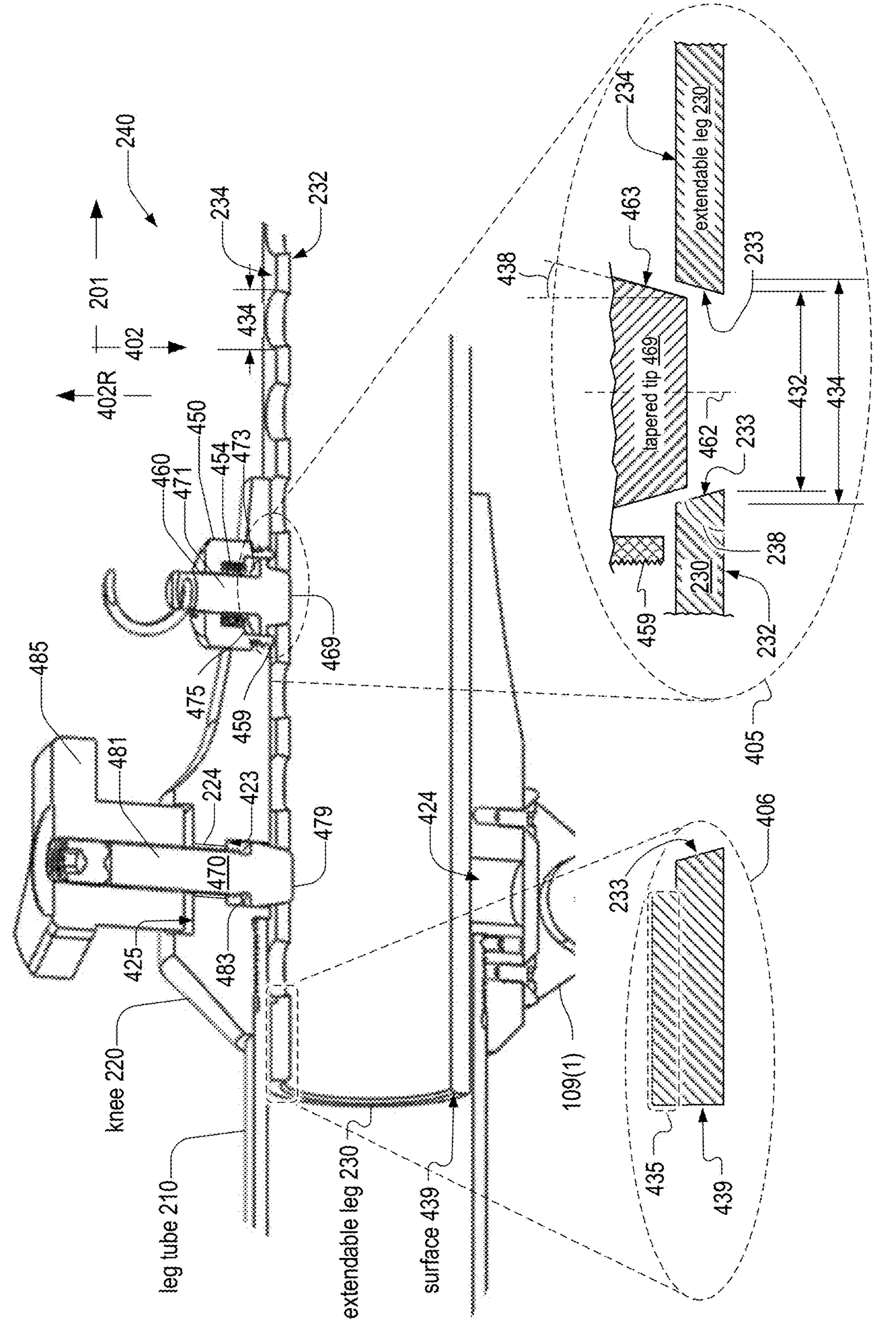
FIG. 4 is a cross-sectional view of the telescoping leg of FIG. 2 that shows its locking mechanism, in embodiments.

FIG. 4 is a cross-sectional view of telescoping leg 240 that shows a locking mechanism 450 in knee 220 and extending into a locating hole 237 of extendable leg 230. Locking mechanism 450 is an example of locking mechanism 250, and includes a tapered pin that is pressed into one of the locating holes by a force applicator. In at least one embodiment, the force applicator is implemented via a locating pin 460 and a spring 454. Locating pin 460 has a pin-tip 469 that extends through knee aperture 222 toward linear hole-array 237A in a direction 402, which is perpendicular to longitudinal direction 201. Pin-tip 469 may be tapered.

FIG. 4 includes an inset 405 that illustrates locating pin 460 partially within a locating hole 237 of extendable leg 230. Extendable leg 230 has an interior surface 232, and exterior surface 234, and a hole-surface 233 therebetween. Locating hole 237 has an interior width 432 in a plane that includes hole-surface 233. Locating hole 237 has an exterior width 434 in a plane that includes exterior surface 234. Exterior width 434 equals or exceeds interior width 432, and each may be between eight millimeters and fifteen millimeters. When tapered hole has a circular cross-section, widths 432 and 434 are diameters.

Locating pin 460 has a side-surface 463 and a pin axis 462, which is parallel to direction 402. Locating pin may be rotationally symmetric, e.g., axially symmetric, about pin axis 462. FIG. 4 denotes an interior taper angle 238 between hole-surface 233 and interior surface 232, and an exterior taper angle 438 between pin axis 462 and side-surface 463. Angles 238 and 438 may be complementary such that tapered surfaces 233 and 463 are parallel in a cross-sectional plane that includes pin axis 462 and is perpendicular to interior surface 232. In embodiments, exterior taper angle 438 is between ten degrees and thirty degrees. In embodiments, locating pin 460 is not tapered, such that angle 438 equals zero and angle 238 may be ninety degrees or less.

When locating pin 460 is aligned with one locating hole 237 and spring 454 is not subject to an externally-applied force, pin-tip 469 extends into locating hole 237 and mates with an hole-surface 233 of one locating hole 237 to lock extendable leg 230 in one position.

Spring 454 applies a force on locating pin 460 in direction 402. A spring constant of spring 454 may be between a lower limit of 18 lbs/in (3152 N/m) and an upper limit 29 lbs/in (5079 N/m). This range of spring constants allows—when angle 438 is between ten degrees and thirty degrees for example—a user to pull locating pin 460 without excessive force while also preventing expected forces in direction 201 from pushing locating pin out of knee aperture 222. Accordingly, the angle 438 is "shallow" such that forces caused by the weight of tripod 100 and an instrument thereon will not cause locating pin 460 to "slide" out of hole 237 it is located in. The angle 438 and mating of locating pin 460 to corresponding taper of locating hole 237 is such that friction between locating pin 460 and locating hole 237 overcomes any lateral forces in the longitudinal direction of leg 240. Spring 454 may be a coiled wave spring for axial compactness.

Locating hole 237 may be axially symmetric and pin-tip 469 may have a circular cross-section in a plane perpendicular to pin axis 462. Alternatively, the shape of locating hole 237 may be a polygon, e.g., rotationally symmetric and not axially symmetric, and pin-tip 469 may have, in a cross-sectional plane perpendicular to pin axis 462, a shape that is geometrically similar to the polygon. Pin-tip 469 may taper from a larger diameter to a smaller diameter. The wider diameter may be great than a smallest diameter of the tapered hole (e.g., diameter 432 in FIG. 4). The smaller diameter may be smaller than a largest diameter of the tapered hole (e.g., diameter 434 in FIG. 4).

In embodiments, locating pin 460 is partially within a cavity of locking mechanism 450 and has a maximum width within the cavity. In such embodiments, locking mechanism 450 has an interior flange, at which a width of the cavity is smaller than the maximum width, such that the interior flange retains locating pin 460 in the cavity. The Tapered tip 469 may have a wider diameter than a rod portion 471, and thus form a flange portion 473. Flange portion 473 serves as a pin-stop to prevent pin 460 from further actuation way from locating hole 237 when it is pulled away (thus compressing spring 454) and abuts a pin-stop surface 475 of the cavity of locking mechanism 450. The depth of the cavity of locking mechanism 450 may be such that the pin tip 479 may be recessed within cavity so as to not interfere with extension and retraction of the extendable leg 230.

In additional or alternative embodiments, the force applicator is a threaded pin that pushes a tapered surface of the locking pin toward and against the tapered surface of the locating hole. For example, telescoping leg 240 may include a threaded pin 470 in threaded aperture 224, as shown in FIG. 4. It should be appreciated that in at least some embodiments, threaded pin 470 is not included, or is the only pin included in tripod 100 and associated leg(s) thereof. When screwed into threaded aperture 224, threaded pin 470 secures a position of extendable leg 230 within the leg tube 210. Threaded pin 470 has a tapered tip 479, which may be the same size and shape of pin-tip 469. When locating pin 460 is aligned with one locating hole 237 of the linear hole-array 237A and threaded pin 470 is screwed into threaded aperture 224, tapered tip 479 extends into an additional locating hole 237 of linear hole-array 237A and mates with the hole-surface 233 of the additional locating hole 237 to further lock extendable leg 230 in the one position.

Threaded pin 470 includes a threaded rod portion 481 coupled to tapered tip 479. Tapered tip 479 may have a wider diameter than threaded rod portion 481, and thus form a flange portion 483. Flange portion 483 serves as a pin-stop to prevent threaded pin 470 from further actuation way from locating hole 237. Threaded rod portion 483 may be attached to a knob 485 used to actuate threaded pin 470 with respect to threaded aperture 224 thereby mating tapered tip 479 with hole-surface 233. The mating of tapered tip 479 with hole-surface 233 provides a more stable locking position than would just using locking pin 460, and the force applied by spring 454. Knob 485 has a threaded aperture that mates with the threads on threaded rod portion 481 of threaded pin 470. In embodiments, knob 485 may additionally be glued or otherwise adhered to threaded rod portion 481 such that actuation of knob 485 only actuates threaded pin 470 with respect to threaded aperture 224 and not knob 485. Thus, the thread diameter of the threaded aperture of knob 485 may be the same diameter as threaded aperture 224 of knee 220.

Tripods 100 including both threaded pin 470 and locking pin 460 provide a dual-advantage where the threaded pin 470 improvement in stability makes the tripod particularly useful for high-precision applications such as metrology-based applications; and the locking pin 460 provides safety and efficiency in use of the tripod 100 to prevent the tripod from tipping over while adjusting the height of each tripod leg.

In embodiments, knee 220 has an aperture 424 located directly opposite threaded aperture 224. Aperture 424 facilitates formation of threaded aperture 224, or adjacent counterbores thereto, in knee 220. For example, knee 220 may include at least one of an inner-counterbore 423 and an outer-counterbore 425, where threaded aperture 224 is between counterbores 423 and 425. When knee 220 at least partially surrounds leg-end 211, aperture 424 enables at least one of inner-counterbore 423 and threaded aperture 224 to be formed by inserting hardware, such as drill bit and a threaded bit through aperture 424 in a direction 402R denoted in FIG. 4. Direction 402R is opposite that of direction 402. Pin 470 may be inserted into threaded aperture 224 by first inserting it up through aperture 424 in direction 402R toward threaded aperture 224. Knee-strut connector 109 may connect knee 220 to strut 108 at aperture 424 such that knee-strut connector 109 covers aperture 424, which improves the aesthetic of telescoping leg 240 and tripod 100. The depth of inner counterbore 423 may be the same as or greater than the length of the tapered tip 479 (from tip to flange 483) such that the entire tapered tip 479 may recess within a cavity formed by inner-counterbore 423 to prevent interference with extending/retracting of extendable leg 230.

FIG. 4 illustrates a top base surface 439 of extendable leg 230 that is opposite bottom base surface 231 of extendable leg 230, which is shown in FIG. 2. Top base surface 439 is inside of leg tube 210. Between top base surface 439 and linear hole-array 237A, extendable leg 230 may include a protrusion 435 that is collinear with linear hole-array 237A, as shown in inset 406 of FIG. 4. Locking mechanism 450 has an end region 459. In embodiments, when locking mechanism 450 is securely screwed into knee aperture 222, end region 459 extends through knee aperture 222 such that end region 459 prevents extendable leg 230 from exiting leg tube 210 by engaging protrusion 435. In embodiments, linear hole-array 237A is within a recessed region of exterior surface 234, and protrusion 435 defines the edge of the recessed region proximate top base surface 439. Protrusion 435 may define an end of recessed region 235R (FIG. 2) within leg tube 210.

Features described above, as well as those claimed below, may be combined in various ways without departing from the scope hereof. The following enumerated examples illustrate some possible, non-limiting combinations.

(A1) In an embodiment of a first aspect, a telescoping leg includes: a leg tube; an extendable leg shaped and sized to slide within the leg tube, and having a linear array of tapered holes in a longitudinal direction along one side of the extendable leg; a knee between the leg tube and the extendable leg, at least partially surrounding an end of the leg tube from which the extendable leg extends, and including a knee aperture; and a locating pin having a tapered tip extending through the knee aperture toward the linear array of tapered holes; and a force applicator that applies a force on the locating pin to press the tapered tip against the tapered hole, when (i) the locating pin is aligned with one tapered hole of the linear array of tapered holes and (ii) the force applicator is not subject to an externally-applied force, the tapered tip extends into the one tapered hole and mates with an interior surface of the one tapered hole to secure a position of the extendable leg within the leg tube.

(A2) In the embodiment (A1), the force applicator may be a spring.

(A3) In any of the embodiments (A1) through (A2), the knee may have a threaded aperture and further comprising: a threaded pin that, when screwed into the threaded aperture, further secures the position of the extendable leg.

(A4) In any of the embodiments (A1) through (A3), the threaded pin may a second tapered tip that, when the locating pin is aligned with the one tapered hole of the linear array of tapered holes and the threaded pin is screwed in the threaded aperture, the second tapered tip extends into an additional tapered hole of the linear array of holes and mates with an interior surface of the additional tapered hole to further lock the extendable leg in the one position.

(A5) In any of the embodiments (A1) through (A4), the threaded pin may be retractable within a cavity in a position that does not interfere with extension and retraction of the extendable leg.

(A6) In any of the embodiments (A1) through (A5), the force applicator may be a threaded rod portion of the locating pin.

(A7) In any of the embodiments (A1) through (A6), the interior surface may have an interior-taper angle with respect to an external lateral surface of the extendable leg, the tapered tip having an exterior-taper angle corresponding to the interior-taper angle.

(A8) In any of the embodiments (A7), the interior-taper angle may be between ten degrees and thirty degrees.

(A9) In any of the embodiments (A7) through (A8), the one tapered hole may be axially symmetric, and the tapered tip having a circular cross-section in a plane perpendicular to an axis of the locating pin.

(A10) In any of the embodiments (A7) through (A9), in a plane perpendicular to an axis of the locating pin: a shape of the one tapered hole being that of a first polygon, and a shaped tapered tip being that of a second polygon that is geometrically corresponding to the first polygon.

(A11) In any of the embodiments (A1) through (A10), the locating pin may be retractable within a cavity in a position that does not interfere with extension and retraction of the extendable leg.

(A12) In any of the embodiments (A1) through (A11), the locating pin and the force applicator may be a component of a locking mechanism secured to the knee aperture.

(A13) In any of the embodiments (A1) through (A12), the knee aperture may be threaded, the locking mechanism may have a threaded exterior lateral surface and be screwed into the knee aperture.

(A14) In any of the embodiments (A1) through (A13), the knee and the leg tube may be integrally formed.

(A15) In any of the embodiments (A1) through (A14), the knee may be attached to the leg tube.

(A16) In any of the embodiments (A1) through (A15), the leg tube and the knee being threadedly attached.

(A17) In any of the embodiments (A1) through (A16), a lateral surface of the extendable leg including a recessed region defining a channel; each tapered hole of the linear array of tapered holes being in the recessed region; and a distal end of the locking mechanism protruding into the channel, thereby preventing the extendable leg from exiting the leg tube.

(A18) In any of the embodiments (A1) through (A17), a width of each tapered hole of the linear array of tapered holes decreasing as a function of distance from an outside surface of the extendable leg.

(A19) A metrology tripod comprising: a center column; a base support attached to the center column; three shoulder assemblies each attached to the base support; three telescoping legs of any of embodiments (A1) through (A18), each attached to a respective one of the three shoulder assemblies; and three struts each attached to and extending from the center column and rigidly displacing a respective one of the three telescoping legs from the center column.

(B1) In embodiments of a second aspect, a telescoping leg includes: a leg tube; an extendable leg shaped and sized to slide within the leg tube, and having a linear array of holes in a longitudinal direction along one side of the extendable leg; a knee between the leg tube and the extendable leg, at least partially surrounding an end of the leg tube from which the extendable leg extends, and including a threaded aperture and a knee aperture; a threaded pin having a threaded-pin tip that, when screwed into the threaded aperture, secures a position of the extendable leg within the leg tube; and a locking mechanism at the knee aperture and including (i) a locating pin having a locating-pin tip extending through the knee aperture toward the linear array of holes; and (ii) a spring that applies a force on locating pin, the force being perpendicular to the longitudinal direction, when (i) the locating pin is aligned with one hole of the linear array of holes and (ii) the spring is not subject to an externally-applied force, the locating-pin tip extends into the one hole and mates with an interior surface of the one hole to further secure the position of the extendable leg.

(B2) In the embodiment (B1), the linear array of holes may be a linear array of tapered holes.

(B3) In the embodiment (B2), a width of each tapered hole of the linear array of tapered holes may decrease as a function of distance from an outside surface of the extendable leg.

(B4) In any of the embodiments (B1) through (B3), the threaded-pin tip being a tapered tip.

(B5) In any of the embodiments (B1) through (B4), the locating-pin tip being a tapered tip.

(B6) In any of the embodiments (B1) through (B5), the threaded-pin tip and the locating-pin tip being retractable within respective cavities in a position that does not interfere with extension and retraction of the extendable leg.

(B7) In any of the embodiments (B1) through (B6), the threaded-pin tip being a first tapered tip; the locating pin tip being a second tapered tip; wherein, when the locating pin is aligned with the one tapered hole of the linear array of tapered holes and the threaded pin is screwed in the threaded aperture, the second tapered tip extends into an additional tapered hole of the linear array of holes and mates with an interior surface of the additional tapered hole to further lock the extendable leg in the one position.

(B8) In any of the embodiments (B1) through (B7), the interior surface having an interior-taper angle with respect to an external lateral surface of the extendable leg, the tapered tip having an exterior-taper angle corresponding to the interior-taper angle.

(B9) In any of the embodiments (B1) through (B8), the interior-taper angle being between ten degrees and thirty degrees.

(B10) In any of the embodiments (B1) through (B9), the knee and the leg tube being integrally formed.

(B11) In any of the embodiments (B1) through (B10), the knee being attached to the leg tube.

(B12) In any of the embodiments (B1) through (B11), the leg tube and the knee being threadedly attached.

(B13) In any of the embodiments (B1) through (B12), a lateral surface of the extendable leg including a recessed region defining a channel; each hole of the linear array of tapered holes being in the recessed region; and a distal end of the locking mechanism protruding into the channel, thereby preventing the extendable leg from exiting the leg tube.

(B14) A metrology tripod comprising: a center column; a base support attached to the center column; three shoulder assemblies each attached to the base support; three telescoping legs of any of embodiments (B1) through (B13), each attached to a respective one of the three shoulder assemblies; and three struts each attached to and extending from the center column and rigidly displacing a respective one of the three telescoping legs from the center column.

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

We claim:

1. A telescoping leg comprising:

a leg tube;

an extendable leg shaped and sized to slide within the leg tube, and having a linear array of tapered holes in a longitudinal direction along one side of the extendable leg;

a knee between the leg tube and the extendable leg, at least partially surrounding an end of the leg tube from which the extendable leg extends, and including a knee aperture; and a locating pin having a tapered tip extending through the knee aperture toward the linear array of tapered holes; and a force applicator that applies a force on the locating pin to press the tapered tip against the tapered hole, when (i) the locating pin is aligned with one tapered hole of the linear array of tapered holes and (ii) the force applicator is not subject to an externally-applied force, the tapered tip extends into the one tapered hole and mates with an interior surface of the one tapered hole to secure a position of the extendable leg within the leg tube; the interior surface having an interior-taper angle with respect to an external lateral surface of the extendable leg, the tapered tip having an exterior-taper angle corresponding to the interior-taper angle.

2. The telescoping leg of claim 1, the force applicator being a spring.

3. The telescoping leg of claim 1, the knee having a threaded aperture and further comprising:

a threaded pin that, when screwed into the threaded aperture, further secures the position of the extendable leg.

4. The telescoping leg of claim 3, the threaded pin having a second tapered tip that, when the locating pin is aligned with the one tapered hole of the linear array of tapered holes and the threaded pin is screwed in the threaded aperture, the second tapered tip extends into an additional tapered hole of the linear array of holes and mates with an interior surface of the additional tapered hole to further lock the extendable leg in the one position.

5. The telescoping leg of claim 3, the threaded pin being retractable within a cavity in a position that does not interfere with extension and retraction of the extendable leg.

6. The telescoping leg of claim 1, the force applicator being a threaded rod portion of the locating pin.

7. The telescoping leg of claim 1, the locating pin retractable within a cavity in a position that does not interfere with extension and retraction of the extendable leg.

8. The telescoping leg of claim 1, the locating pin and the force applicator being a component of a locking mechanism secured to the knee aperture.

9. The telescoping leg of claim 8, a lateral surface of the extendable leg including a recessed region defining a channel;

each tapered hole of the linear array of tapered holes being in the recessed region; and a distal end of the locking mechanism protruding into the channel, thereby preventing the extendable leg from exiting the leg tube.

10. The telescoping leg of claim 1, a width of each tapered hole of the linear array of tapered holes decreasing as a function of distance from an outside surface of the extendable leg.

11. A metrology tripod comprising:

a center column;

a base support attached to the center column;

three shoulder assemblies each attached to the base support;

three telescoping legs of claim 1, each attached to a respective one of the three shoulder assemblies; and three struts each attached to and extending from the center column and rigidly displacing a respective one of the three telescoping legs from the center column.

12. A telescoping leg comprising:

a leg tube;

an extendable leg shaped and sized to slide within the leg tube, and having a linear array of tapered holes in a longitudinal direction along one side of the extendable leg;

a knee between the leg tube and the extendable leg, at least partially surrounding an end of the leg tube from which the extendable leg extends, and including a threaded aperture and a knee aperture;

a threaded pin having a threaded-pin tip that, when screwed into the threaded aperture, secures a position of the extendable leg within the leg tube; and a locking mechanism at the knee aperture and including (i) a locating pin having a locating-pin tip extending through the knee aperture toward the linear array of tapered holes; and (ii) a spring that applies a force on the locating pin, the force being perpendicular to the longitudinal direction, when (i) the locating pin is aligned with one hole of the linear array of tapered holes and (ii) the spring is not subject to an externally-applied force, the locating-pin tip extends into the one tapered hole and mates with an interior surface of the one tapered hole to further secure the position of the extendable leg, a width of each tapered hole of the linear array of tapered holes decreasing as a function of distance from an outside surface of the extendable leg.

13. The telescoping leg of claim 12, the threaded-pin tip being a tapered tip.

14. The telescoping leg of claim 12, the locating-pin tip being a tapered tip.

15. The telescoping leg of claim 12, the threaded-pin tip and the locating-pin tip being retractable within respective cavities in a position that does not interfere with extension and retraction of the extendable leg.

16. The telescoping leg of claim 12, the threaded-pin tip being a first tapered tip; the locating pin tip being a second tapered tip; wherein, when the locating pin is aligned with the one tapered hole of the linear array of tapered holes and the threaded pin is screwed in the threaded aperture, the second tapered tip extends into an additional tapered hole of the linear array of holes and mates with an interior surface of the additional tapered hole to further lock the extendable leg in the one position.

17. The telescoping leg of claim 16, the interior surface having an interior-taper angle with respect to an external lateral surface of the extendable leg, the tapered tip having an exterior-taper angle corresponding to the interior-taper angle.

18. The telescoping leg of claim 12, a lateral surface of the extendable leg including a recessed region defining a channel;

each hole of the linear array of tapered holes being in the recessed region; and a distal end of the locking mechanism protruding into the channel, thereby preventing the extendable leg from exiting the leg tube.

19. A metrology tripod comprising:

a center column;

a base support attached to the center column;

three shoulder assemblies each attached to the base support;

three telescoping legs of claim 17, each attached to a respective one of the three shoulder assemblies; and three struts each attached to and extending from the center column and rigidly displacing a respective one of the three telescoping legs from the center column.

* * * * *